(No Model.)
F. A. HEAD.
CULTIVATOR.
No. 539,223. Patented May 14, 1895.
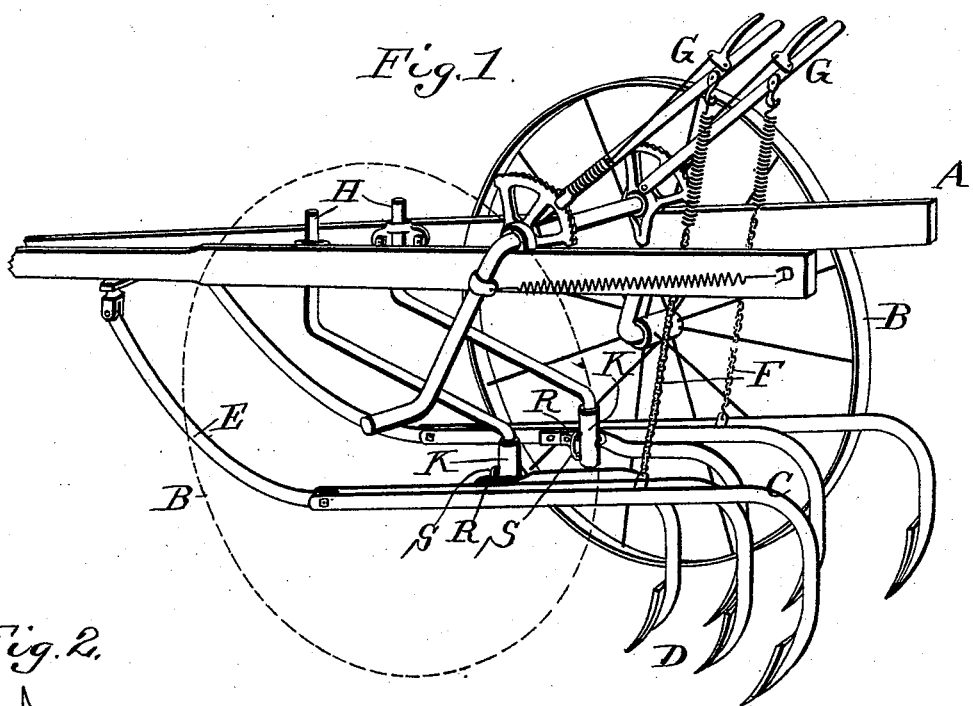
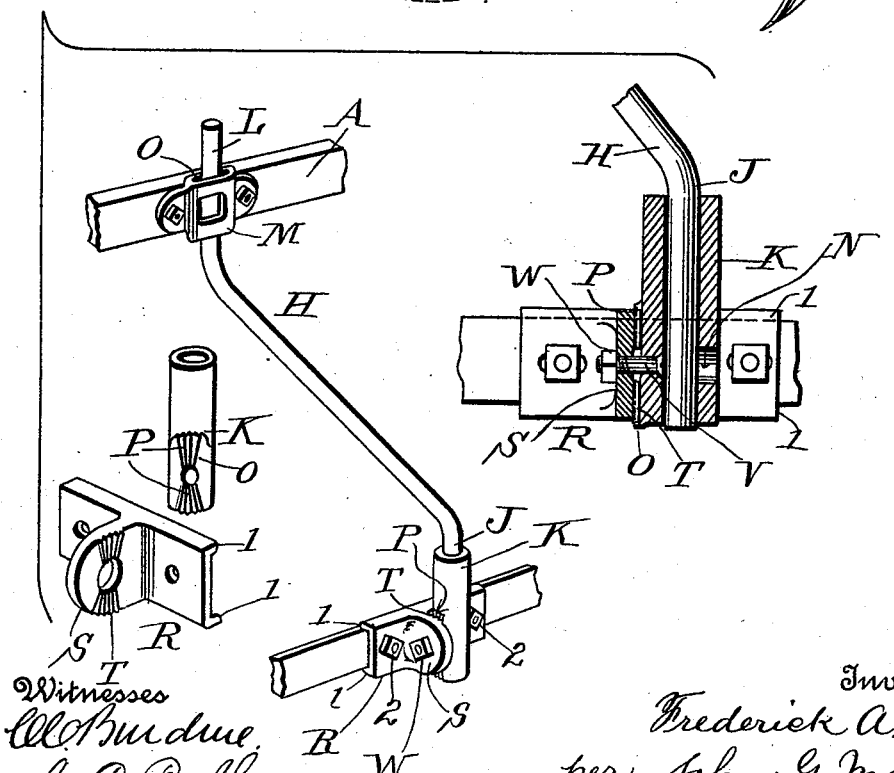
Witnesses
Inventor
Frederick A. Head
per John G. Manahan
his Attorney

UNITED STATES PATENT OFFICE.

FREDERICK A. HEAD, OF ROCK ISLAND, ILLINOIS.

CULTIVATOR.

SPECIFICATION forming part of Letters Patent No. 539,223, dated May 14, 1895.

Application filed February 27, 1895. Serial No. 539,907. (No model.)

*To all whom it may concern:*

Be it known that I, FREDERICK A. HEAD, a citizen of the United States, residing at Rock Island, in the county of Rock Island and State of Illinois, have invented certain new and useful Improvements in Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in riding cultivators and consists in certain novel devices interposed between the frame of the machine and the shovel gang, in the rear of the pivotal connection of the shovel gang beam to the said frame. The purpose and use of said interposed device is, first, to maintain a uniform position or plane to the shovel gang at all points of the lateral movement of said gang, and, second, to furnish means to pitch or tilt the shovel gang laterally and to hold them in such inclined position. The advantage of the first named result is that the shovels remain in the same plane collectively, at whatever part of the arc of their movement they may be swung. Therefore, if the shovels be set at a uniform depth, that uniformity will be maintained during the lateral movements of said gang, and if the gang be purposely adjusted with the inner or outer shovel having the deepest cut, such relatively inclined position will also be preserved throughout the lateral swing of the gang.

The advantage of securing the second result above named lies in the fact that the corn plant in the early cultivation thereof, is too small and weak to resist any heavy stream of earth, while, as the corn becomes older and larger, it can not only stand up against the heavy furrow, but the latter is of positive benefit if not an actual necessity. It is usually preferred in the beginning of such cultivation to tilt the inner side of each gang upward so as to cause the inner shovels to take a shallow cut and throw less earth toward the plant; while in the latter stages of cultivation, such gangs are placed in a reverse position, or with the inner shovel having the deepest cut so as to throw as much earth as possible around the hill of corn so as to cover the weeds in and around such hill, and also to leave a furrow close to the latter for the retention of rain and moisture.

I attain the above purposes by the construction exhibited in the accompanying drawings, in which—

Figure 1 is a perspective of a machine embodying my invention. Fig. 2 shows details of the interposed device before referred to and the mode of its attachment and operation.

Similar letters and figures refer to similar parts in each view.

As my invention is adapted for application and use on the swinging shovel or disk gangs of any cultivator, and its attachment thereto can easily be accomplished, I do not deem it essential to specifically describe all of the usual and well known parts of any machine of the above type, nor to describe more than is required to plainly show the construction of my invention, its position relative to the parts to which it is attached, and its mode of operation.

As my invention on a straddle-row cultivator is in duplicate and its application to and operation with each gang is precisely the same in character, I will limit and simplify the description thereof to its application and operation in reference to one gang.

A is a portion of the frame of the machine and consists of one of the rear ends of a two part pole supported at its front end in a neck yoke, and at its rear end in any suitable manner upon the carrying wheels B.

C is a shovel frame usually containing two or more shovels D and provided with a forwardly projecting beam E pivotally and adjustably connected at its forward end to the under side of the frame A.

F is the usual chain connecting the shovel frame C with the lifting and adjusting lever G seated adjustably in any of the usual modes on the frame of the machine.

H is a double crank guide arm the intermediate portion of which is diagonal but may be horizontal and its end portions nearly vertical.

A metallic socket K is adjustably seated vertically against the side of the shovel frame C as follows: On the front side of the lower portion of the socket K, there is formed a flat and slightly raised surface O, provided with radial surface corrugations P. A clip R provided with lateral flanges 1. 1. adapted to embrace the upper and lower edges of the frame C is securely bolted to the side of said frame by bolts 2 and provided further with an outwardly extending lug S having radial corrugations T on its rear surface, adapted to optionally engage the corrugations P of the socket K. A bolt V, having its head countersunk in the inner surface of the front wall of the socket K, projects therefrom centrally through lug S and is provided with nut W. A suitable hole N in the opposite or rear wall of socket K, admits the bolt V. By this bolt V, the corrugations P and T are held in any desired mutual engagement, and thereby the frame C and its adjunctive shovels be optionally tilted laterally with reference to socket K.

The upper end L of the arm H is loosely held in a vertical sleeve M, suitably attached to the side of the frame A, a proper distance forward of the shovel frame C, and in the rear of the attachment of the front end of the beam E of the shovel frame. The rear end J, of said arm is sleeved loosely in a socket K, seated on frame C. The forward and upper vertical end L of the arm H has such vertical formation a sufficient distance above and below the sleeve M to permit said bar to be raised and lowered through the sleeve M, in the necessary vertical movements of the shovel frame C.

As the vertical opening in the sleeve M transversely of no greater width than the diameter of the end L, the arm H is not permitted, at such forward connection to have any lateral oscillation, but simply an axial rotation. Provision however is made for any necessary fore and aft movements of the end L, in the lateral swingings of the shovel frame C, by forming the interior of the sleeve M of a slot like formation parallel with the frame A.

The advantages of my invention have been heretofore mentioned. Its operation is as follows: The end L of the arm H is held at all times in a substantially vertical position which compels a retention of the socket K in the same position. In the lateral swingings of the frame C, the necessary rotation of the arm H takes place in the sleeve M and socket K but as the upper end L of said arm cannot change its position laterally with reference to frame A, the frame C, in its lateral swings is always held by arm H in the same substantially horizontal plane, in which it is set, by the optional interlocking of the corrugations P and T as aforesaid. The necessary vertical movement of the frame C is permitted by the end movement of the arm H in the sleeve M.

What I claim as my invention, and desire to secure by Letters Patent of the United States, is—

1. In a cultivator, the combination of the frame A, shovel frame C, provided with beam E pivotally attached to frame A, socket K seated laterally adjustable on the frame C, arm H having its ends J and L bent into different vertical planes and its lower end J loosely seated in socket K, and a sleeve M attached to the frame A and adapted to loosely receive the upper end of the arm H, substantially as shown and for the purpose described.

2. In a cultivator, the combination of a suitably supported frame A, a shovel frame C provided with beam E pivotally attached at its forward end to the said frame A, and a substantially vertical crank arm H having the diagonal or horizontal center and substantially vertical ends, the upper of such ends being loosely sleeved vertically in or on the frame A, and the lower of such ends being loosely held substantially vertical in a socket seated adjustably on said frame C, substantially as shown and for the purpose specified.

3. In a cultivator, the combination of a suitably supported frame, a shovel frame pivotally attached thereto, a clip R seated on said shovel frame, and provided with a corrugated lug S, socket K laterally adjustable on said lug, sleeve M seated on said first named frame forward of the position of socket K and a double crank guide arm provided with a diagonal or horizontal center and practically vertical ends, adapted to axially rotate respectively in said sleeve and socket, substantially as shown and for the purpose described.

In testimony whereof I affix my signature in presence of two witnesses.

FREDERICK A. HEAD.

Witnesses:
W. J. KAHLKE,
L. C. BLANDING.